United States Patent [19]

Muller

[11] 3,963,209

[45] June 15, 1976

[54] EJECTOR PIN ASSEMBLY FOR INJECTION MOULDING TOOLS

[76] Inventor: Hans K. Muller, Krakkarrsgatan 31, 502 40 Boras, Sweden

[22] Filed: Aug. 21, 1974

[21] Appl. No.: 499,545

Related U.S. Application Data

[63] Continuation-in-part of Ser. No. 245,953, April 21, 1972, abandoned.

[30] Foreign Application Priority Data

Apr. 22, 1971 Sweden.............................. 5240/71

[52] U.S. Cl.................................. 249/67; 164/344; 249/74
[51] Int. Cl.².......................................... B29C 7/00
[58] Field of Search............ 249/65, 66, 66 A, 66 C, 249/67, 68, 74, 116; 425/441, 444; 164/344; 29/275, 278; 79/1 E

[56] References Cited
UNITED STATES PATENTS

| | | | |
|---|---|---|---|
| 1,915,729 | 6/1933 | Gathmann | 249/74 |
| 3,334,378 | 8/1967 | Scherrer-Wirz et al. | 249/68 |
| 3,817,678 | 6/1974 | Armour | 425/441 |

*Primary Examiner*—Francis S. Husar
*Assistant Examiner*—Robert J. Charvat
*Attorney, Agent, or Firm*—Ulle C. Linton

[57] ABSTRACT

In an ejector pin assembly for injection moulding tools the ejector pin plate is positively retracted and locked in its rear position by providing the tool with a rearwardly extending hollow housing, having an inner annular pocket, by slidably arranging in said housing a slidable member, being connected to the ejector pin plate and having radial holes for receiving cupling elements such as balls, segments or the like, by arranging in said housing a spring operated member, which normally prevents the coupling elements from penetrating said sliding member inwardly and by securing to the generally stationary ejector means of the injection moulding machine an ejector rod, which near its free end has an annular groove into which said coupling elements may enter when said rod has been introduced in the housing and the spring operated member as a consequence thereof has been displaced such that it does not any longer cover said openings.

5 Claims, 4 Drawing Figures

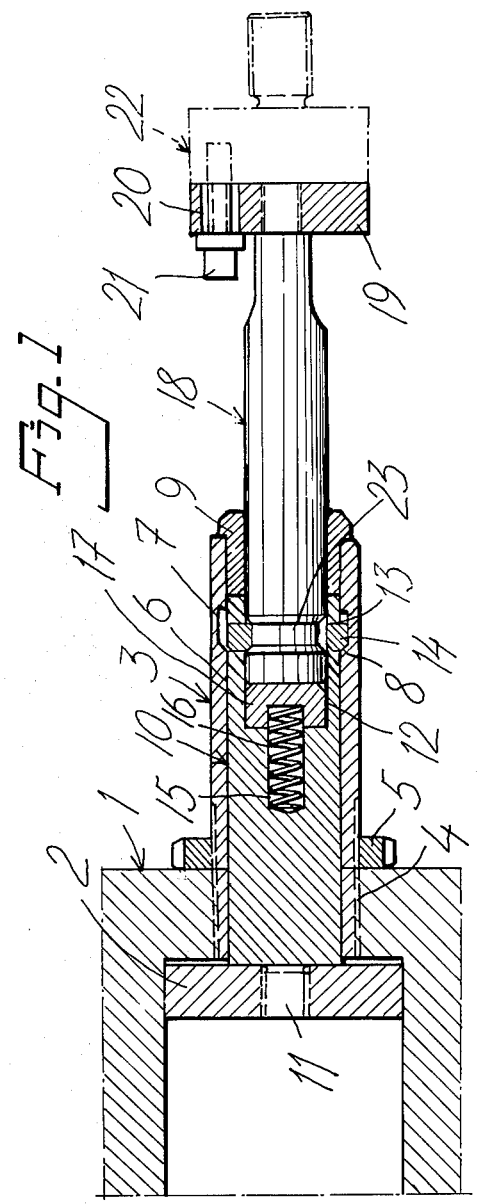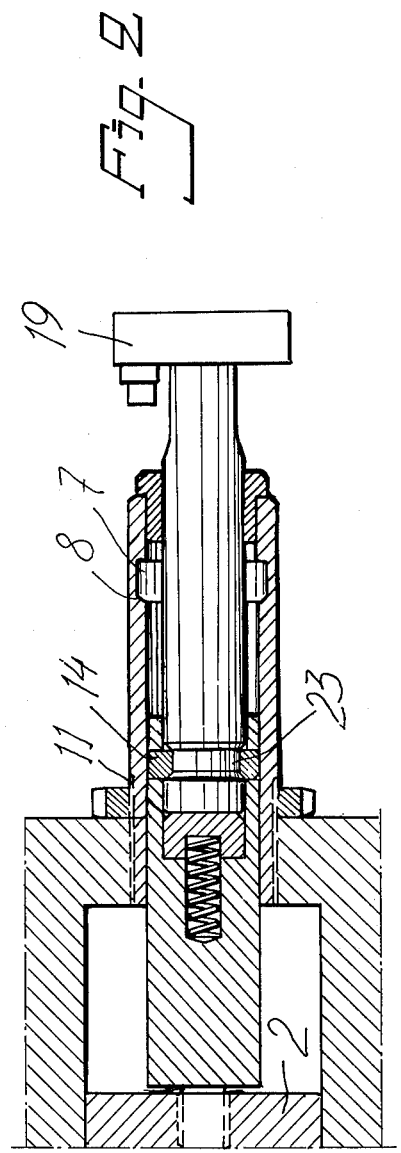

EJECTOR PIN ASSEMBLY FOR INJECTION MOULDING TOOLS

The present application is a continuation-in-part of my copending application Ser. No. 245,953 filed Apr. 21, 1972, now abandoned.

This invention relates to ejector pin assemblies for such injection moulding tools and the similar in which the ejector pin plate of the tool is adapted to be brought back by force to the idle original position thereof in connection with the clamping or closing of the mould.

Especially by the use of injection moulding tools provided with cores being movable perpendicular to the opening direction of the mould, such as cores for generating threads or the similar, it is of greatest importance that the ejector pin assembly is brought back by force to the idle original position in connection with the clamping of mould. In case this should not occur there is a danger of damaging the tool.

Thus, the primary object of the invention is to provide an ejector pin assembly that guarantees the forced retraction of the ejector pin plate to the original position and at the same time fixedly locks the same in the rear position thereof. This latter characteristic is of special importance by the use of high-speed machines where there is a danger that the ejector pin plate is brought to undesired movement by recoil forces or the like.

To accomplish these and other objects the invention has the characteristics according to the following claims.

In the accompanying drawing an examplifying embodiment of the invention is shown, whereby, FIG. 1 is a section through the rear part of an injection moulding tool having an ejector pin assembly connected thereto according to the invention, showing the ejector pin assembly in the position wherein the ejector pin plate has been retracted and the ejector rod is about to leave the rest of the ejector pin assembly.

FIG. 2 illustrates the same ejector pin assembly during the actual ejecting movement.

Figure 3:
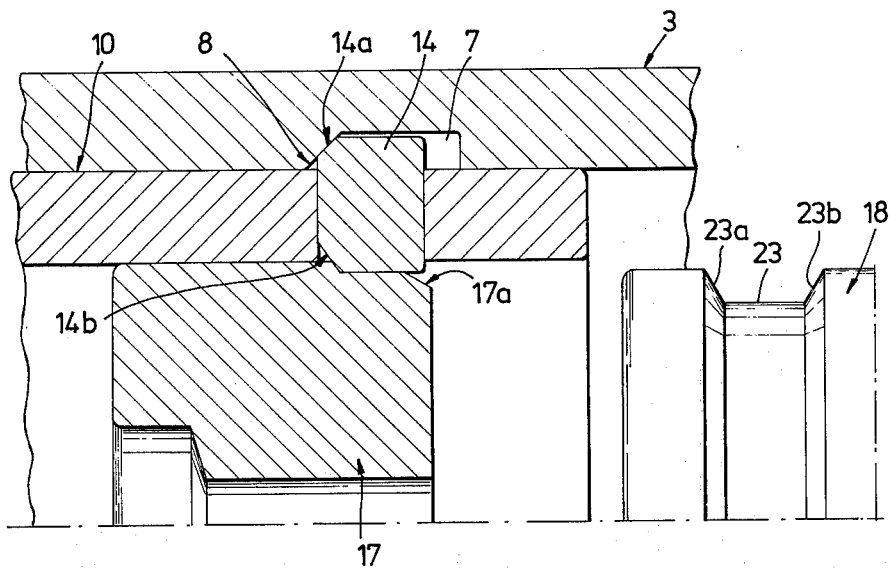
FIG. 3 is a sectional view on a larger scale of a portion of the ejector rod entering the housing forming parts of the present device, and, FIG. 4 is a cross-sectional view of the present device mounted on a portion of a mold.

FIGS. 1 and 2, reference numeral 1 generally designates an injection moulding tool, only the rear end of which being shown. An ejector pin plate 2 is slidably adapted in a known manner in a cavity in the injection molding tool, said ejector pin plate enabling the ejection of the ready molded details from the mold by ejector pin E, see FIG. 4. Reference numeral 3 generally designates an outer housing one end thereof having an outer thread 4 to co-operate with or engage a corresponding thread in the rear part of the injection molding tool 1. The housing 3 may be fixed in any desired axial position in relation to the injection molding tool be means of locking nut 5. The housing 3 has a bore 6, having near its rear end an internal annular pocket 7 preferably defined by concial surfaces 8, as seen in FIGS. 1–3.

A closure in the form of a hollow bushing 9, having an inner diameter corresponding to that of bore 12, is pressed into the free end of housing 3. A sliding member, generally designated 10, is slidably mounted in the bore of the housing 3. The sliding member 10 is fixedly connected to the ejector pin plate 2 for example by a threaded member 11. In the opposite end thereof it has an axially extending bore 12 and a number of radially provided holes 13 communicate therewith, whereby coupling means, for example segments, balls or similar means are inserted in said holes. Also a smaller axial bore 15 communicates with the bore 12 and a helical spring 16 is inserted into said bore 15. Said spring acts upon a stop member 17 slidably mounted in the bore. This stop member has a somewhat greater diameter than the bore of bushing 9 in order that the same may not leave said housing.

An ejector rod 18 is fixedly connected to the generally fixed ejector pin member of the injection molding machine. For this purpose said ejector rod is preferably connected to a centering flange 19, having one or more anchor holes 20 for bolts 21 by aid of which said anchor flange may be fixed to the stationary part designated by 22 of the injection molding machine. Close to the opposite end thereof the ejector rod 18 has a turning 23.

Figure 4:
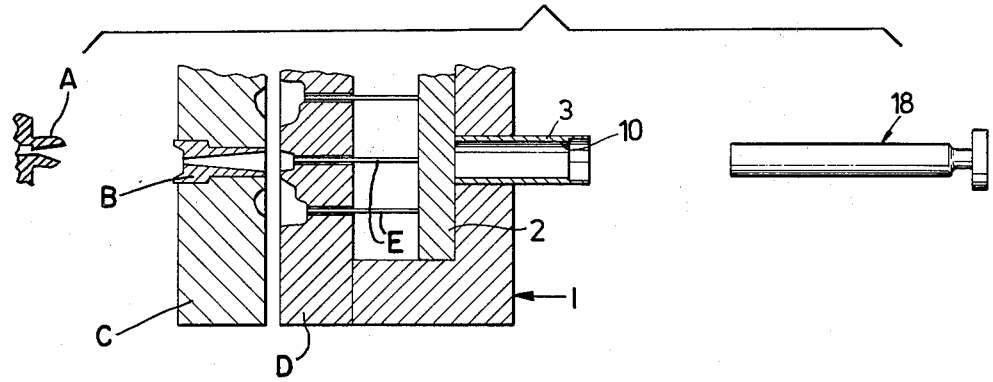

FIG. 4 shows a portion of a conventional mold having a nozzle A, mold nozzle B in the front mold part C and a movable rear mold part D slidably carrying ejector pins E. Injection molding tool 1 is positioned against rear mold part D.

The assembly described above functions in the following way: By closing the mold C-D the injection molding tool 1 moves with the movable rear mold part D of the mold and moves away from the stationary part 22 such that said rear mold part comes into contact with the front mold part C which closes said movable rear mold part to constitute the mold assembly and which parts are shown in FIG. 4. Conventionally said mold parts include a mold nozzle B for cooperation with a corresponding nozzel A of an injection molding machine to permit melted plastic material to reach the cavities of the mold for obtaining the desired molded parts. Owing to the movement of the mold rear part D the ejector rod 18 completely leaves housing 3 and as a consequence thereof the segments 14 are displaced radially outwards by the shoulder 23a of groove 23 engaging the slanted edge 14b of the segments such that the segments are pushed in the annular pocket 7. Spring 16 presses stop member 17 outwardly and consequently said member 17 takes a position (limitated by bushing 9) in which it prevents the segments 14 from leaving said pocket 7 and entering into the bore of sliding member 10 with any part thereof. The ejector pin plate 2 is now in its rear position and in this position it is fixed against movement as the segments 14 lock housing 3 and sliding member 10 against mutual displacement.

After the preformed injection molding the moveable rear part D of the mold moves towards the stationary member 22 and as a consequence thereof ejector rod 18 enters into housing 3. In this movement it pushes stop member 17 in front of itself and since the length of the stop member 17 is precisely determined the turning 23 of ejector rod 18 will be positioned immediately at the inner side of the segments 14 and by the continued movement of ejector 10 and stop 17 to the left of FIG. 1 sliding member 10 will move the slanted edge 14a of said segments over the concial surface of pocket 7 and said segments will be pushed into said turning 23. Thus the ejector pin plate 2 may be displaced to the ejecting position shown in FIG. 2. During this movement the ejector pin plate and the ejector rod are fixedly secured to each other. This is also the case when the mold again starts to close as previously described but when the ejector pin plate 2 has reached its rear position according to FIG. 1 and the mold is completing its closing operation the ejector rod is discouped as previously mentioned.

In the position according to FIG. 1 ejector rod 18 has not yet left housing 3. In its way out of said housing the sloping surface 23a of ejector rod pushes the segments 14 outwardly. The spring biassed member 17 is in contact with the end surface of rod 18 and via its sloping surface 17a it takes over the function of said rod which is to hold the segments in their projected position. When the ejector rod has entirely left the segments 14 the stop member 17 holds said segments in their projected position as clearly appears from FIG. 3.

When the ejector rod 18 is again introduced in the housing the segments 14 may enter the groove 23. As appears from the drawing the undermost segments may drop down by gravity to the position illustrated in FIG. 1 but due to the sloping surfaces 8 and 14a also these segments will be pressed into the groove 23 when the ejector rod continues its movement into the housing. The end position of the ejector rod is shown in FIG. 2 and it is clear that the ejector rod and the sliding member are coupled to each other during this movement. Thus it is seen that sliding member 10 and ejector rod are coupled together during the ejection operation and that sliding member 10 and housing 3 are coupled together during the rest of the cycle.

I claim:

1. An ejector device for a mold for injection molding, comprising a mold having an ejector pin plate located in the mold, a hollow sleeve being secured to the rear end of said mold and projecting backwards therefrom, a sliding member being slidably arranged in said sleeve and having one end thereof positioned for acting upon said ejector plate whereas its opposite end is tubular and is provided with radially extending holes, coupling members slidable in said holes, an ejector rod having a free end portion provided with an annular groove and having at least in said end portion a diameter such that it may be introduced in said tubular part of said sliding member, the wall thickness of said tubular part of said sliding member and the depth of said annular groove of said ejector rod being such that when said groove and said holes are in register and the coupling members are in said annular groove said coupling members do not project outside said sliding member whereas said coupling members project outside said sliding member when said coupling members are in contact with the ungrooved portion of said ejector rod, said sleeve having an internal annular groove provided to receive said coupling members, a spring biassed member being arranged within said tubular part of said sliding member and being provided to hold in its normal outer position said coupling members in their projecting position.

2. An ejector device as claimed in claim 1 wherein said spring biassed member has such a length that the sum thereof and the distance between the free end of the ejector rod and the annular groove thereof corresponds to the distance between the bottom of the axial bore forming the tubular part of said sliding member and the radial openings for said coupling means.

3. An ejector device as claimed in claim 1 wherein said mold has a threaded opening, said sleeve has a threaded end in threaded engagements with said mold opening and a locking nut on said sleeve threaded end fixes said sleeve relative to said mold.

4. An ejector device as claimed in claim 1 wherein said annular groove of said sleeve has at least one end thereof defined by a conical surface.

5. An ejector device as claimed in claim 1 wherein said ejector rod in that end thereof which is opposite to the ejector plate has a centering flange.

* * * * *